United States Patent
Katata

[11] 4,226,381
[45] Oct. 7, 1980

[54] TAPE REEL
[75] Inventor: Tetsuo Katata, Kawaguchi, Japan
[73] Assignee: Dai-Ichi Seiko Co., Ltd., Kawaguchi, Japan
[21] Appl. No.: 16,730
[22] Filed: Mar. 1, 1979
[30] Foreign Application Priority Data
Mar. 4, 1978 [JP] Japan ............... 53-27899[U]
[51] Int. Cl.³ .................................... B65H 75/18
[52] U.S. Cl. ..................................... 242/71.8
[58] Field of Search ............ 242/71.8, 115, 116, 242/118, 118.6, 118.61

[56] References Cited
U.S. PATENT DOCUMENTS
2,529,420  11/1950  Ramquist ............... 242/71.8 X
3,275,257  9/1966   Cherniavskyj ........... 242/71.8
3,822,841  7/1974   Campbell ............... 242/115

FOREIGN PATENT DOCUMENTS
1144588  2/1961  Fed. Rep. of Germany ......... 242/71.8
2223294  10/1974 France ....................... 242/71.8

Primary Examiner—Edward J. McCarthy
Attorney, Agent, or Firm—Cushman, Darby and Cushman

[57] ABSTRACT

A tape reel comprising a lower reel member consisting of a disc-like portion and a hub which are designed as an integral part, protrusions having claw-like heads formed on the end surface of said hub and a disc-like upper reel member, whereby said upper and lower reel members can be assembled and fixed to each other by fitting the protrusions formed on the hub into the holes formed in said upper reel member.

6 Claims, 6 Drawing Figures

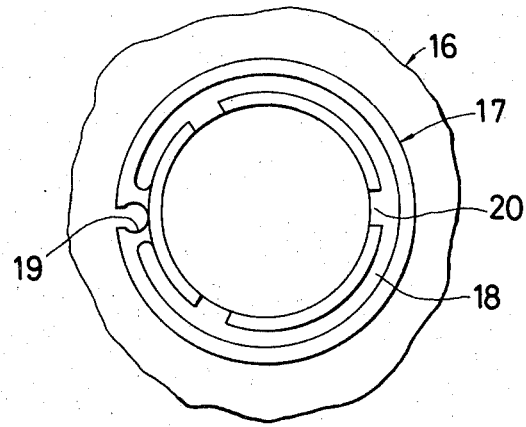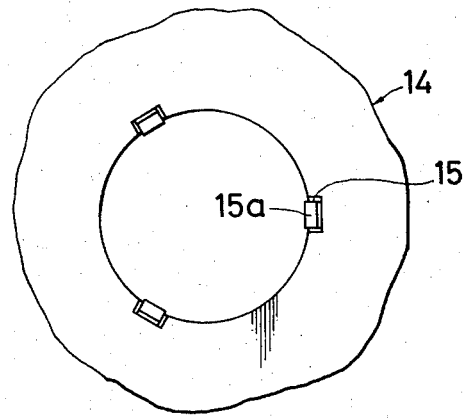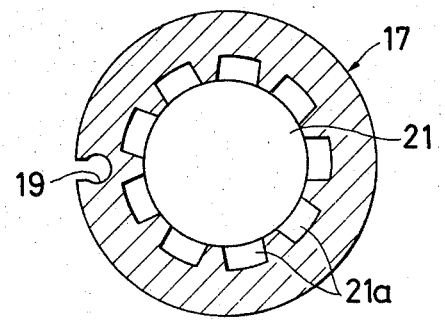

TAPE REEL

BACKGROUND OF THE INVENTION a. Field of the Invention

The present invention relates to a tape reel and, more specifically, to a tape reel for use with a video cassette.

b. Description of the Prior Art

The conventional tape reel for use with a video cassette consists, as shown in FIG. 1, a lower reel member 1 having a hub 2 and an upper reel member 3 which are assembled with each other by fitting plural number of protrusions 2a formed on the hub 2 of the lower reel member 1 into holes formed in the number corresponding to that of said protrusions 2a in the upper reel member 3, and then fixed to each other by fixing the protrusions 2a by a means such as ultrasonic welding.

Such a conventional example had a defect that it requires a large number of manufacturing stages since welding of the upper and lower reel members is necessary after they have been assembled. Further, it had an additional defect that the reel members may be deformed at the welding stage, thereby making it impossible to manufacture tape reels with high precision.

SUMMARY OF THE INVENTION

A general object of the present invention is to provide a tape reel comprising a lower reel member consisting of a disc-like flange and a hub which are made integral and a disc-like upper reel member, said two members being fixed to each other by fitting protrusions having claw-like heads formed on either member into holes formed in the other member.

BRIEF DESCRIPTION OF THE DRAWINGS

FIG. 4 illustrates a plan view showing details of the construction of the lower reel member of the Embodiment 2;

FIG. 5 illustrates a plan view showing details of the construction of the upper reel member of the Embodiment 2; and FIG. 6 illustrates a sectional view taken along VI—VI in FIG. 3.

DESCRIPTION OF THE PREFERRED EMBODIMENTS

Figure 1:
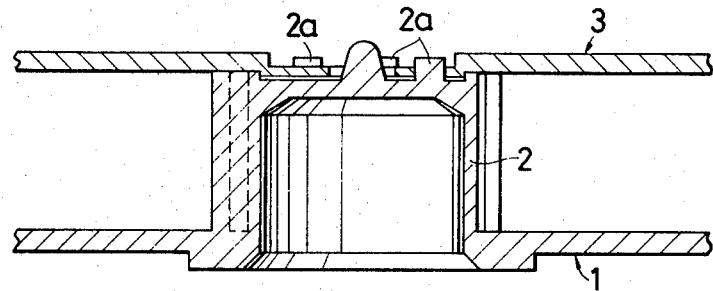
FIG. 1 shows a sectional view illustrating the construction of the conventional tape reel.
Figure 2:
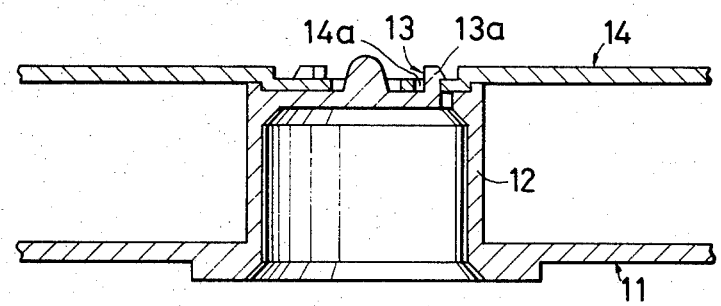
FIG. 2 shows a sectional view illustrating the construction of an embodiment of the tape reel according to the present invention.
Figure 3:
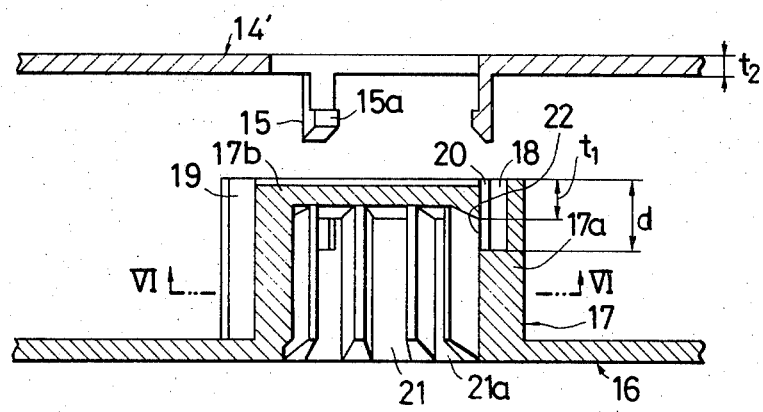
FIG. 3 shows a sectional view illustrating the construction of another embodiment of the present invention.

Referring now to the accompanying drawings, some preferred embodiments of the tape reel according to the present invention will be described. FIG. 2 shows a sectional view illustrating the constructions of the main parts in the Embodiment 1 of the present invention wherein shape of the protrusions formed on the hub is different from that of the conventional tape reel shown in FIG. 1. Speaking concretely, the embodiment is different from the conventional tape reel in that the former has claw-like heads 13a on the tops of the protrusions 13 on the hub 12 of the lower reel member 11. When the heads 13a of the protrusions 13 are forcibly fitted into the holes 14a of the upper reel member 14 which has the same shape as that of the conventional tape reel, the protrusions 13 are flexed and inserted, whereby heads 13a are engaged with the holes 14a of the upper reel member to fix both the reel members as shown in FIG. 2. FIG. 3 shows the Embodiment 2 of the present invention wherein the protrusions for fixing the upper and lower reel members are formed on the upper reel member. Speaking concretely, protrusions 15 are formed on the upper reel member 14', whereas holes to be engaged with the claw-like heads 15a of the protrusions 15 are formed in the cylindrical circumferential wall around the hollow portion 21 of the hub 17 of the lower reel member for inserting a driving shaft. The upper and lower reel members are assembled and fixed by inserting the protrusions into the holes to compose a tape reel in the procedures similar to those described with reference to the Embodiment 1.

In the Embodiment 2 shown in FIG. 3, groove 18 having a definite depth d is formed in the circumferential wall 17a with notch portion 19 left for fixing a tape as shown in FIG. 4, and slots 20 are further formed at constant intervals so as to form holes 22 which pass from the groove 18 to the hollow portion 21 of the hub 17 for inserting a driving shaft. When the upper and lower reel members are asembled with each other, the protrusions 15 of the upper reel member are inserted into the slots 20 and the heads 15a of the protrusions 15 are engaged with the holes 22, thereby fixing both the reel members to each other.

Thickness $t_1$ of the side 17b of the hub to be brought into contact with the upper reel member is larger than the thickness $t_2$ of the flange on the side of the reel. Therefore, the protrusions 15 of the Embodiment 2 are longer than the protrusions 13 in the Embodiment 1. In the embodiment 2, therefore the protrusions are flexed more easily and have lower possibility of breakage in assembling and fixing both the upper and lower reel members. In the Embodiment 2, it is not always necessary to form the groove as shown in FIG. 3, but will be sufficient to form holes for engaging the protrusions only at the portions for inserting the protrusions. When the reel members are manufactured by molding a synthetic resin, however, thick portions will be deformed and cannot be manufactured with high precision due to contraction of the resin at the molding stage. In order to correct this defect, it is generally practised to thin such portions, for example, by forming a groove as shown in FIG. 3. In the Embodiment 2 of the present invention, it is possible to form holes for fixing the upper and lower reel members very easily simply by forming the slots while utilizing the groove. Further, when three protrusions are formed on the upper reel member, it is preferable to form the corresponding holes 22 in vertically elongated slots 21a (refer to FIG. 3 and FIG. 6) which are formed on the side of the hollow portion 21 of the hub 17. Since a driving shaft has three protrusions within the range to be inserted into the hub, slots 21a are formed at the intermediate portion of the hub as shown in FIG. 6 for fitting the above-mentioned protrusions of the driving shaft. However, the driving shaft is a simple cylinder in the section from its intermediate point to the tip. When the holes are formed in the slots (generally three or its integral multiples), the heads of the protrusions engaged with the holes are not brought into contact with the driving shaft, thereby assuring advantage in practice. Shallow slots will be sufficient in such a construction. Furthermore, such a construction makes it possible to reserve a long distance longitudinally from the surface of the hub to be brought into contact with the upper reel member to the holes. This therefore permits protrusions 15 to be longer so that they can be flexed more easily.

As is clearly understood from the foregoing descriptions, the tape reel according to the present invention does not require welding or similar means for fixing the upper and lower reel members which instead can be assembled and fixed to each other simply by forcibly fitting protrusions formed on the upper or lower reel member in the holes formed in the other reel member so as to compose a tape reel. Therefore, the present invention can remarkably simplify the stage of assembling the reel members without fear of degradation of manufacturing precision due to deformation. The embodiment 2 of the present invention makes it possible to design longer protrusions which can be flexed larger and have lower possibility of breakage, thereby permitting fixing both the reel members more strongly.

I claim:
1. A tape reel comprising:
a lower reel member including a disc-like portion and integral therewith a cap-like hub extending upwardly and including an integral upper end surface,
flexible protrusions projecting upwardly from said upper end surface of said hub and having claw-shaped heads, and
a disc-like upper reel member having holes axially disposed therein, there being respective surfaces adjacent said holes for catching said claw-shaped heads, whereby said lower and upper reel members can be assembled and tightly fixed to each other by snap fitting said protrusions formed on said hub of said lower reel member into said holes formed on said upper reel member.

2. A tape reel comprising:
a disc-like upper reel member,
flexible protrusions projecting downwardly from said upper reel member and having claw-like heads, and
a lower reel member including a disc-like flange and integral therewith an upstanding hub having an integral upper end surface and a circumferential side wall the latter of which contains a plurality of protrusion engagement holes having an axial portion extending inside said side wall from said end surface axially a given distance and then a radial portion extending radially for providing respective surfaces for catching said claw-like heads, whereby said upper and lower reel members can be assembled and tightly fixed to each other by snap fitting the protrusions formed on said upper reel member into the holes formed in the side wall of said hub.

3. A tape reel as in claim 2 wherein said hub side wall has a circumferential protrusion-engagement groove extending downwardly from said end surface for said given distance and including at least a portion of each said axial portion of said holes.

4. A tape reel as in claim 2 or 3 wherein said hub has an interior which is hollow and said radial portions of said holes extend to said hollow interior.

5. A tape reel as in claim 4 wherein said side wall has a plurality of axial slots extending from said end surface said given distance as part of said axial portions of said holes and forming said radial portions thereof.

6. A tape reel comprising:
a first reel member including a disc-like portion and integral therewith a hub extending axially therefrom and having an integral cap-like outer end from which a circumferential ridge projects axially outwardly,
a disc-like second reel member having a central area with means complimenting said ridge for maintaining said first and second reel members radially fixedly centered relative to each other, and
a plurality of circumferentially spaced protrusions projecting axially outwardly from said cap-like outer end of said hub,
each said protrusion indlucing a flexible shank having at its outer end a head with a claw-like latching member extending radially from said shank,
said central area of said second reel member having a plurality of circumferentially spaced through holes mating said shanks and having respective surrounding material cooperating with said latching members to effect a snap fit therebetween for fixedly securing said hub and second reel member together axially.

* * * * *